US012650685B2

(12) United States Patent
Bhattacharyya et al.

(10) Patent No.: US 12,650,685 B2
(45) Date of Patent: Jun. 9, 2026

(54) SMART CONTROLLER FOR INDUSTRIAL ASSET HEALTH MONITORING

(71) Applicant: Schneider Electric Systems USA, Inc., Foxborough, MA (US)

(72) Inventors: Amitabha Bhattacharyya, Hyderabad (IN); Srisuhasini Gottumukkala, Hyderabad (IN); Prashant Chandanapurkar, Pune (IN); Bhaskar Sinha, Hyderabad (IN)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 400 days.

(21) Appl. No.: 18/214,809

(22) Filed: Jun. 27, 2023

(65) Prior Publication Data

US 2024/0201678 A1 Jun. 20, 2024

(30) Foreign Application Priority Data

Dec. 15, 2022 (IN) .............................. 202211072577

(51) Int. Cl.
 *G05B 23/02* (2006.01)
 *G01M 99/00* (2011.01)
 *G06Q 10/06* (2023.01)
(52) U.S. Cl.
 CPC ....... *G05B 23/0243* (2013.01); *G01M 99/005* (2013.01); *G06Q 10/06* (2013.01)

(58) Field of Classification Search
None
See application file for complete search history.

(56) References Cited

U.S. PATENT DOCUMENTS

2007/0168057 A1 7/2007 Blevins et al.
2014/0222212 A1 8/2014 Anderson et al.

FOREIGN PATENT DOCUMENTS

EP 4084254 A1 11/2022

OTHER PUBLICATIONS

Extended European Search Report for EP Application No. 23209923.4, May 10, 2024, 10 pages.

*Primary Examiner* — Sean Shechtman
(74) *Attorney, Agent, or Firm* — Stinson LLP

(57) ABSTRACT

A smart controller continuously monitors data for determining in real time if there is a likelihood that an asset will be shut down and, if so, recommends a new setpoint at which the asset will continue to operate but will not lead to tripping of the system. The smart controller executes a simulation engine to test the new setpoint before implementation to optimize performance while avoiding a shutdown. In this manner, the smart controller provides early warning of possible shutdowns and ensures that key assets are less likely to be shut down.

18 Claims, 6 Drawing Sheets

402
9/5/2022, 5:27:52 pm: Asset Health is Good and is running at 300 RPM
9/5/2022, 5:27:52 pm: Change in vibration detected. However, Vibration is within iso range. System is in Stable condition.
9/5/2022, 5:37:52 pm: Asset Health is Good and is running at 390 RPM.
9/5/2022, 5:37:52 pm: Change in vibration detected. However, Vibration is within iso range. System is in Stable condition.
9/5/2022, 5:47:52 pm: Asset Health is Good and is running at 480 RPM.
9/5/2022, 5:47:52 pm: Change in vibration detected. However, Vibration is within iso range. System is in Stable condition.
9/5/2022, 5:57:52 pm: Asset Health is Good and is running at 570 RPM.
9/5/2022, 5:57:52 pm: Change in vibration detected. However, Vibration is within iso range. System is in Stable condition.

404
9/5/2022, 6:07:52 pm: Asset Health is Unsatisfactory and is running at 570 RPM.
9/5/2022, 6:07:52 pm: Change in vibration detected. Vibration is starting to exceed iso guidelines. Faults detected are Unbalance. System is in Unsatisfactory condition.

406
9/5/2022, 6:17:52 pm: Asset Health is Critical and is running at 660 RPM.
9/5/2022, 6:17:52 pm: Change in vibration detected. Vibration exceeds iso guidelines. Faults detected are Misalignment, Looseness, Unbalance. System is in Unsatisfactory condition. Please revert back to last Stable condition.

408
9/5/2022, 6:27:52 pm: Asset Health is Unsatisfactory and is running at 570 RPM.
9/5/2022, 6:27:52 pm: Change in vibration detected. Vibration is starting to exceed iso guidelines. Faults detected are Misalignment, Unbalance. System is in Unsatisfactory condition.

410
9/5/2022, 6:37:52 pm: Asset Health is Good and is running at 480 RPM.
9/5/2022, 6:37:52 pm: Change in vibration detected. However, Vibration is within iso range. System is in Stable condition.

FIG. 4

SMART CONTROLLER FOR INDUSTRIAL ASSET HEALTH MONITORING

CROSS-REFERENCE TO RELATED APPLICATION

This application claims priority to Indian Patent Application No. 202211072577, filed Dec. 15, 2022, the entire contents of which are incorporated herein by reference for all purposes.

BACKGROUND

Currently, condition monitoring systems (e.g., vibration analysis, motor current signature analysis, etc.) are installed on critical industrial assets such as pumps and motors. The monitoring systems measure vibration data or current signature data and perform as 'threshold-based' safety systems. That is, the threshold-based safety system provides upper and lower limits to generate alarms for alerting an operator and, if the limits are crossed, shutting down the asset completely. Unfortunately, suddenly shutting down an asset often leads to undesirable process disruptions in critical operations. Moreover, the lengthy delays needed to restart the asset after shutting it down can result in production loss. Assets typically deteriorate over time due to friction, mechanical load variations, and environmental conditions, which makes them more likely to be shut down by a threshold-based safety system.

SUMMARY

Aspects of the present disclosure provide continuous monitoring of data from a condition monitoring system for determining in real time if there is a likelihood that an asset will be shut down by a safety system and, if so, recommending new setpoints at which the asset will continue to operate without tripping the safety system. In this manner, a smart controller in accordance with the present disclosure provides early warning of possible shutdowns and safe operating conditions to ensure that key assets are less likely to be shut down.

In an aspect, a controller comprises a control processor coupled to an asset of an industrial process and an asset condition monitor and a simulation engine coupled to the control processor. The control processor is configured to generate a control signal for controlling the asset and the asset performs an operation of the industrial process in response to the control signal. The asset condition monitor is configured to determine a current condition of the asset based on the control signal controlling the asset and a sensor signal generated by a sensor monitoring the asset during performance of the operation. The control processor is further configured to generate a modified control signal based on the determined current condition of the asset. The simulation engine is configured to simulate the asset performing the operation of the industrial process in response to the modified control signal and to predict a future condition of the asset as a function thereof. The control processor is further configured to provide the modified control signal for controlling the asset in response thereto when the predicted future condition of the asset indicates the asset operating in a desired condition.

In another aspect, a method of controlling an industrial asset performing an operation of an industrial process comprises providing a setpoint to the asset for controlling the asset, wherein the asset performs the operation of the industrial process based on the setpoint. The method also comprises monitoring an operating parameter of the asset performing the operation of the industrial process, determining a current condition of the asset based on the setpoint and the operating parameter, and, in response to the current condition indicating the asset is operating in an undesired condition, identifying a new setpoint for the asset to address the undesired condition. The method further includes predicting a future condition of the asset as a function of the asset operating based on the new setpoint and providing the new setpoint to the asset when the predicted future condition of the asset indicates the asset operating in a desired condition.

In yet another aspect, an automation system comprises an asset of an industrial process, a control processor coupled to the asset, a sensor configured to monitor the asset during performance of an operation of the industrial process, and a memory storing computer-executable instructions. The control processor is configured to generate a control signal for controlling the asset and the asset performs the operation in response to the control signal. When executed, the computer-executable instructions configure the control processor for determining a current condition of the asset based on the control signal controlling the asset and a sensor signal, generating a modified control signal based on the determined current condition of the asset, simulating the asset performing the operation of the industrial process in response to the modified control signal, and predicting a future condition of the asset as a function of the simulating. The modified control signal is provided for controlling the asset when the predicted future condition of the asset indicates the asset operating in a desired condition.

Other objects and features of the present disclosure will be in part apparent and in part pointed out herein.

BRIEF DESCRIPTION OF THE DRAWINGS

FIG. 4 is an example of operator assistant messages generated by an asset condition monitoring system according to an embodiment.

Corresponding reference numbers indicate corresponding parts throughout the drawings.

DETAILED DESCRIPTION

Figure 1:
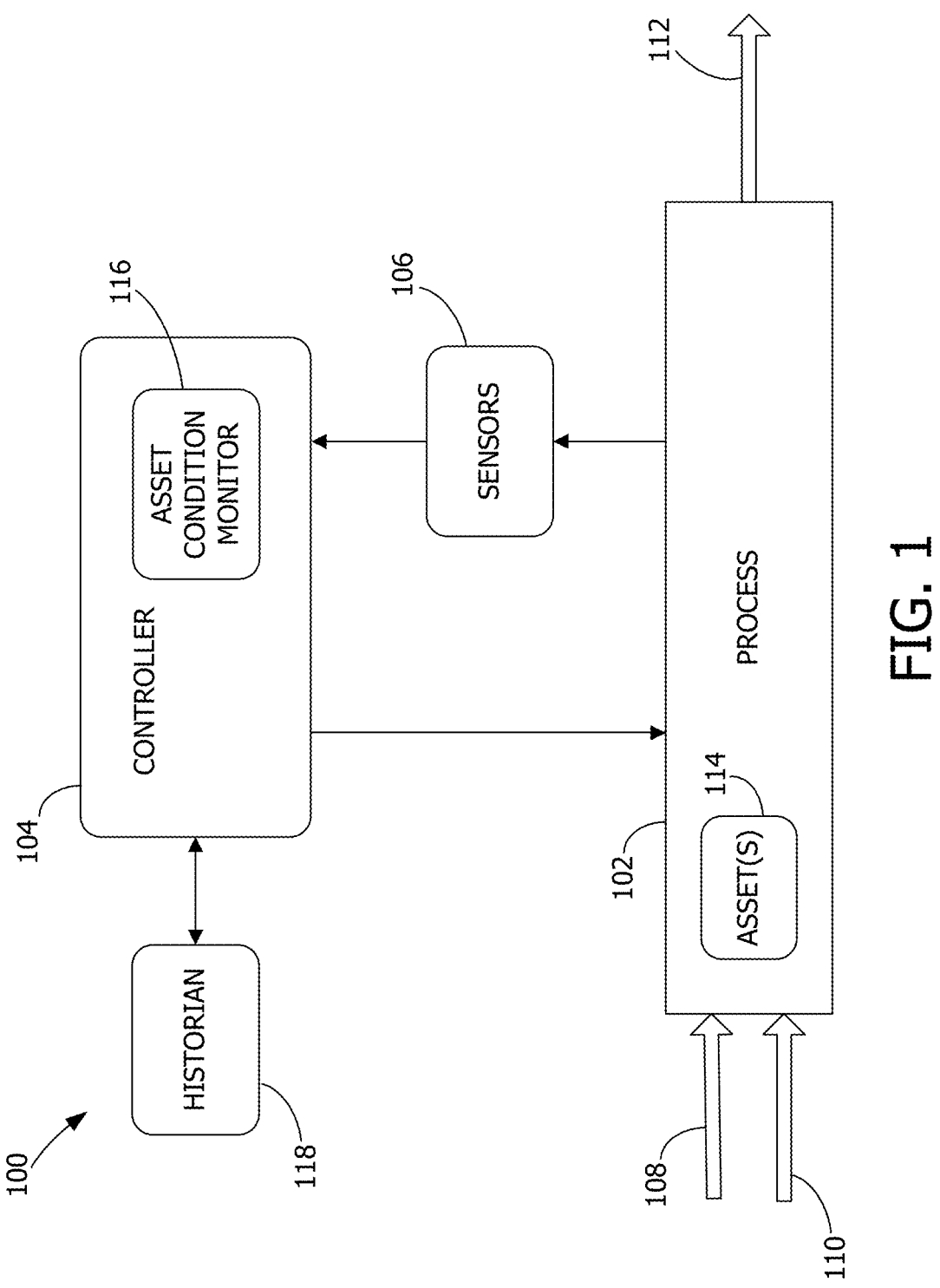
FIG. 1 is a block diagram illustrating a process control system according to an embodiment.

FIG. 1 displays the basic structure of an example process control system 100. In an embodiment, a process 102 is communicatively connected to a controller 104 and sensors 106. The process 102 has inputs 108 and 110 that comprise the necessary inputs for the process to create an output 112. In an embodiment, the input 108 includes energy for powering process 102 and input 110 includes physical or chemical raw materials for use in process 102. The output 112 comprises physical or chemical products from the process or produced energy in the form of electricity or the like.

The controller 104 sends data to process 102 in order to direct the operations of process 102 according to the goals of controller 104. The data sent comprises commands that operate various types of process elements, or assets 114, of the process, such as pumps, motors, valves, actuators, or the like. The asset 114 may be any mechanical, chemical, electrical, biological, or combined mechanism or set of mechanisms that is used to convert energy and materials into value added products or production. The sensors 106 monitor process 102 at various points and gather data from those points. The sensors 106 then send the data gathered to controller 104. Based on the gathered data, controller 104 can send additional commands to process 102. In this way, the system 100 forms a control feedback loop, where controller 104 reacts to changes in process 102 as observed by sensors 106. Different actions carried out by process 102 according to the commands of controller 104 may change the data being gathered by sensors 106, thus causing further adjustments by controller 104 in response to those changes. By implementing this control feedback loop, process 102 can be controlled by controller 104 in an efficient manner.

To ensure safe operation, controller 104 includes one or more asset condition or health monitoring systems 116 responsive to sensors 106 for performing vibration analysis, motor current signature analysis, and the like on critical assets 114. In the illustrated embodiment, system 100 also includes a historian 118 configured to capture and store industrial data, including process, alarm, and event history data.

Figure 2:
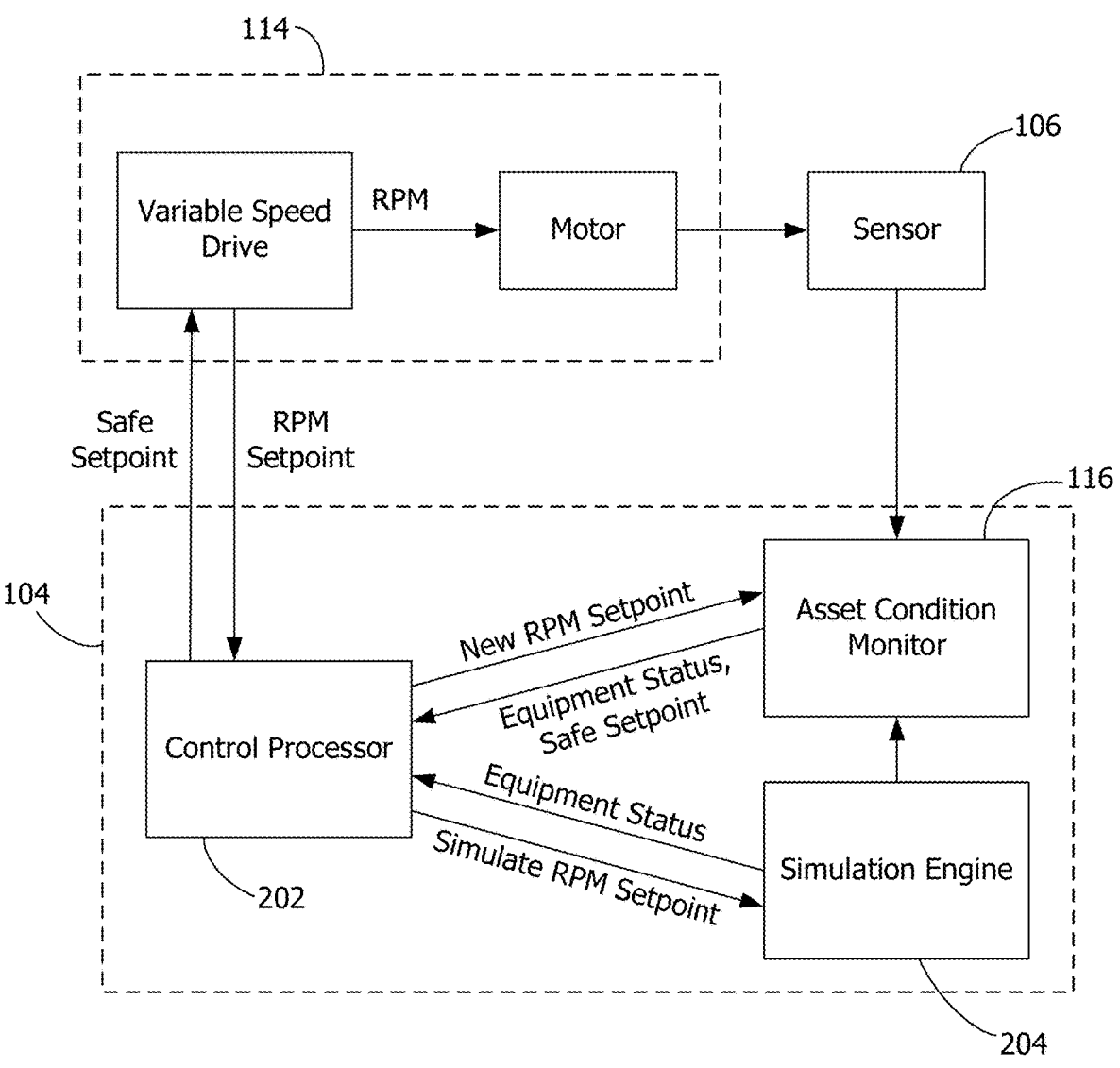
FIG. 2 is a block diagram illustrating further aspects of the control system of FIG. 1 according to an embodiment.

Referring now to FIG. 2, an additional software component embodying aspects of the present disclosure is integrated with controller 104 to enable controlling the assets based on both asset condition and process parameter. In FIG. 2, controller 104 comprises a control processor 202 for commanding a setpoint to asset 114, illustrated as a motor having a variable speed drive. As described above, the asset 114 may be any control element of process 102. The asset condition monitor 116 provides asset health data. In an embodiment, controller 104 includes a memory storing computer-executable instructions that, when executed by control processor 202, configure controller 104 to implement asset condition monitor 116. The smart controller 104 is trained with asset data to detect when asset 114 experiences a mechanical failure. Upon receiving the asset health data, if the health status of asset 114 is good, control processor 202 sets a new setpoint for optimizing performance. On the other hand, if the health status of asset 114 is not good, control processor 202 rolls back or reverts the setpoint to a safe value when the health status was good.

The controller 104 preferably provides continuous monitoring of data from asset condition monitor 116 for determining in real time if there is a likelihood that asset 114 will be shut down and, if so, controller 104 causes asset 114 to operate at a new setpoint at which asset 114 will continue to run without tripping of the safety system. In this manner, smart controller 104 in accordance with the present disclosure provides early warning of possible shutdowns and ensures that key assets are less likely to be shut down.

In an embodiment, controller 104 maintains a knowledge base of asset fault detection in a simulator engine 204. The knowledge base of simulator engine 204 is built and configured to query anomalous behavior of asset 114. The simulator engine 204 simulates operation of the industrial asset 114 with the new setpoint. For example, simulator engine 204 classifies the type of potential mechanical failure based on asset vibration data, predicts the health status of asset 114 to pair with controller processor 202 at the new setpoint, and makes the decision to proceed with the new setpoint or to revert the asset 114 to the closest safe setpoint.

In the event of an undesired condition leading to trip limits (e.g., crossing high-high), simulation engine 204 alerts control processor 202 to reset back to a desired condition, such as the last known safe setpoints, which prevents tripping. In an embodiment, controller 104 includes a memory storing computer-executable instructions that, when executed by control processor 202, configure controller 104 to implement simulation engine 204.

In this manner, the simulator engine 204, or digital twin portion, of controller 104 permits testing and adjusting (if necessary) the setpoints intended to address or overcome the anomalous conditions identified by asset condition monitor 116 until an optimum setpoint is achieved. And, once an optimum setpoint is achieved with simulator engine 204, controller 104 controls the real asset 114 in response to or using the new optimum setpoint. The experimentation of selecting and optimizing setpoints takes place within simulator engine 204, which prevents asset 114 from being damaged during the optimum setpoint selection.

The controller 104 operating in accordance with the present disclosure controls the asset operation parameters based on process parameters as well as the condition of the asset (e.g., using vibration, motor current signature analysis, etc.). In addition, controller 104 controls operations parameters in such a way that in the interim the uptime of asset 114 is ensured, and the process remains under stable condition preventing downtime of asset 114. The controller 104 also simulates a digital twin of the process and asset conditions and is able to predict asset condition before a change in the condition of asset 114 before catastrophic failure of asset 114 might occur.

Figure 3:
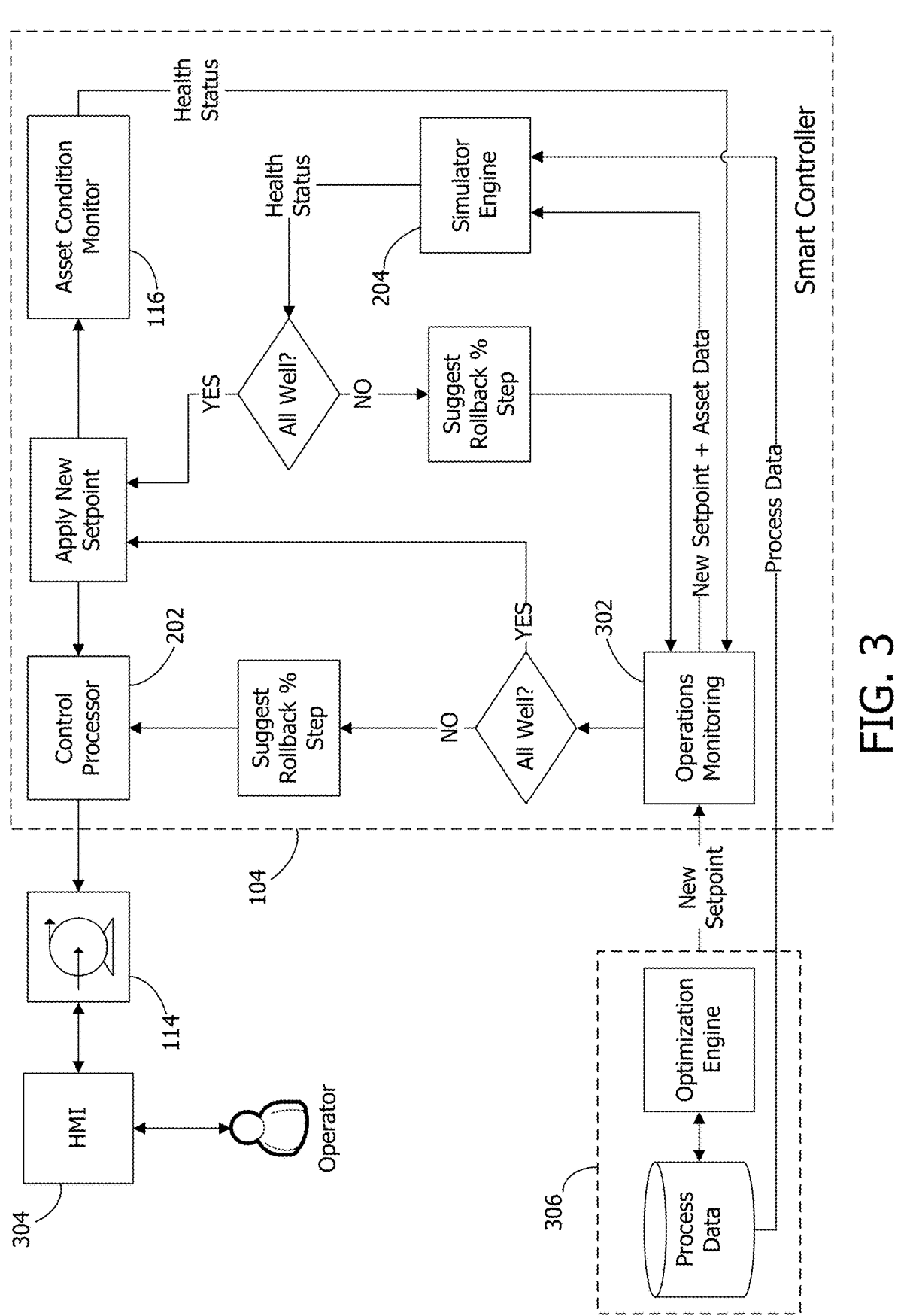
FIG. 3 is a block diagram illustrating further aspects of the control system of FIG. 2 according to an embodiment.

FIG. 3 illustrates additional aspects of the control system of FIG. 2. According to the embodiment of FIG. 3, controller 104 comprises control processor 202 for commanding a setpoint to asset 114. An operations monitoring system 302 receives asset health data from asset condition monitor 116 for determining the health of asset 114. The smart controller 104 is trained with asset data to detect when asset 114 experiences a mechanical failure. Upon receiving the asset data, the operations monitoring system 206 identifies the asset condition and, if the health status of asset 114 is good, operations monitoring system 302 causes control processor 202 to set a new setpoint for optimizing performance. On the other hand, if the health status of asset 114 is not good, operations monitoring system 302 causes control processor 202 to roll back or revert the setpoint to a value when the health status was good. In the event a mechanical fault is detected, controller 104 raises a maintenance alarm to an operator via a human-machine interface (HMI) system 304. In an embodiment, controller 104 includes a memory storing computer-executable instructions that, when executed by control processor 202, configure controller 104 to implement operations monitoring system 302.

An optimization subsystem 306 embodying aspects of the present disclosure uses process data, asset data, and artificial intelligence-based techniques able to identify failure conditions and recommend solutions for a maintenance engineer. Maximum resource utilization and uptime are the key factors that influence the quality of the output and the profitability of the manufactured product. In an embodiment, the subsystem 306 generates the new setpoint.

In an embodiment, simulator engine 204 cooperates with asset condition monitor 116 and operations monitor 302 to enable communication and suggest the action to control processor 202 about the consequences of the new setpoint to reduce the risk of plant trip or change in output quality due to the change in process parameter.

Typical controllers only look at process parameter(s), and not asset condition(s). According to aspects of the present disclosure, smart controller 104 (e.g., Field Control Processor (FCP) 280 smart controller) uses process data and asset health conditions to achieve optimum plant throughput. The controller 104 can suggest one or more actions to be taken to make process 102 run at minimum randomness. The smart controller 104 reverts asset 114 to the safe point in case of catastrophic conditions, which reduces the likelihood of plant tripping and, thus, improves asset life. It also reduces operator effort to change the setpoint to an optimum condition.

In an embodiment, controller 104 measures and analyzes industrial asset parameters for identifying anomalous working conditions of asset 114. For example, the primary data required may be vibration data and the secondary data may be motor current signature or any other process parameters. Over time, assets 114, such as pumps and motors, deteriorate due to friction and other physical effects. The controller 104 embodying aspects of the present disclosure is able to identify such deterioration and recommend new setpoints based on asset condition. Simulating operation of the industrial asset 114 with the new setpoint or operation using simulator engine 204 permits testing the new setpoints before they are put into operation. Controlling operation of the industrial asset 114 after identifying an optimum setpoint or operating condition for the industrial asset prevents undesirable shutdowns.

Current solutions in the market focus more on saving asset 114 by switching off the power but this leads to undesirable downtime. The control system 100 of the present disclosure keeps asset 114 safe by controlling the optimal operating conditions ins such a way that the balance of pump safety, for example, and uptime are maintained. This approach avoids the expensive downtime and ensures production is not adversely impacted.

Figure 5:
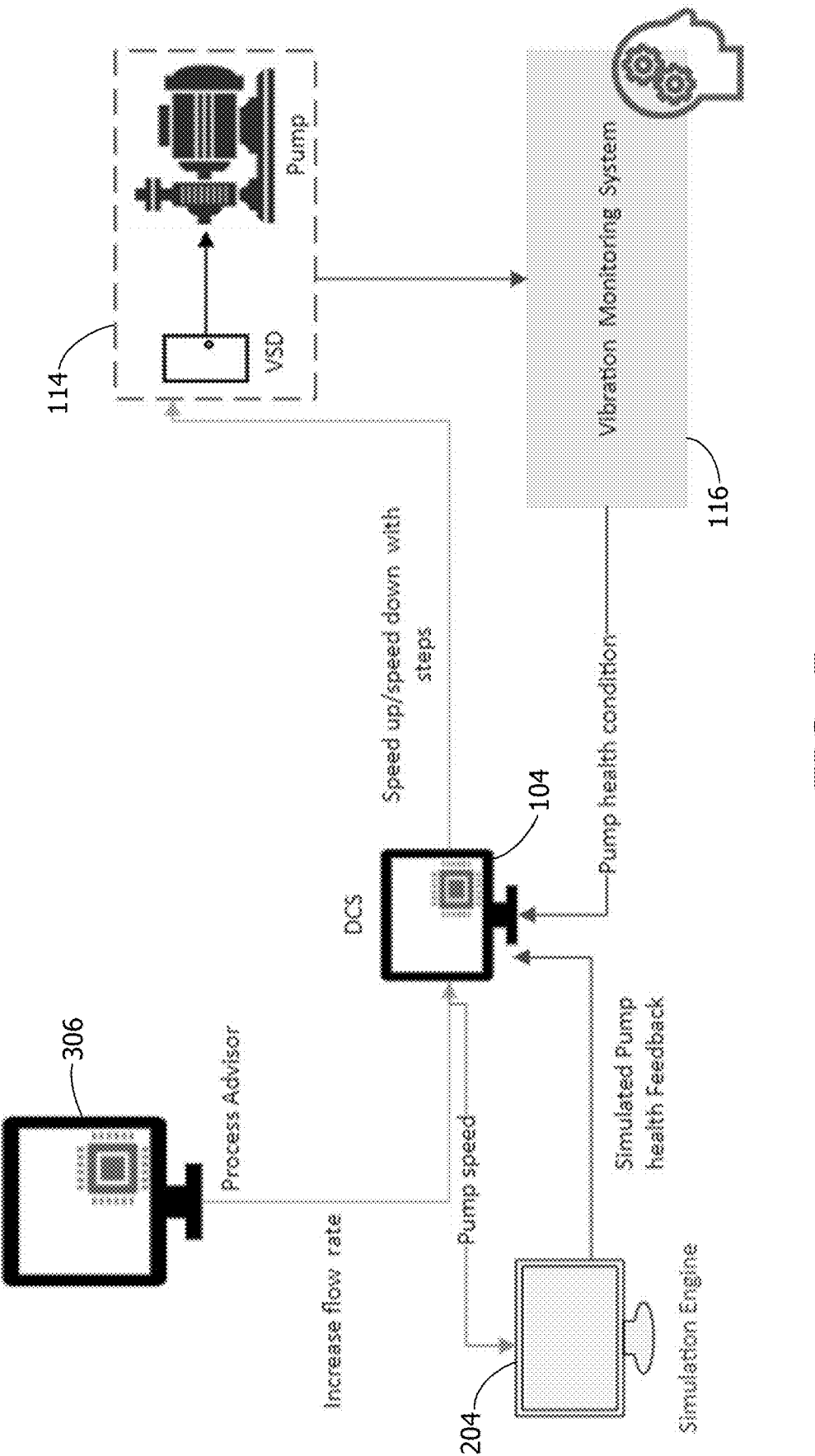
FIG. 5 is a block diagram illustrating a process control system according to another embodiment.

FIG. 4 illustrates an example messaging from asset condition monitor 116 during operation. At 402, asset condition monitor 116 indicates Stable operation such that controller 104 is able to increase the RPM setpoint of asset 114 (e.g., a motor). At 404, asset condition monitor 116 indicates Unsatisfactory operation resulting from an Unbalance fault but vibration in the motor has not exceeded guidelines for long enough for asset health to become Critical. At 406, the message from asset condition monitor 116 indicates asset health is now Critical resulting from Misalignment, Looseness, and Unbalance faults. In this instance, vibration in the motor exceeds guidelines. At 408, controller 104 rolls back the setpoint to the previous value. This results in asset condition monitor 116 indicating Unsatisfactory operation resulting from Misalignment and Unbalance faults but vibration in the motor is not Critical. At 410, controller 104 rolls back the setpoint again, which reverts asset 114 to Stable operation FIG. 5 is a block diagram illustrating a process control system according to another embodiment in which the control system is responsive to direct feedback. In FIG. 5, a process advisor embodied by, for example, optimization subsystem 306, recommends a new flowrate setpoint, which is then converted to pump RPM by controller 104 of a distributed control system (DCS). The DCS decides a speed change based on the new flowrate setpoint. For example, if the DCS wants to change the speed from 300 RPM to 500 RPM, the DCS may DCS decide that the 200 RPM increase should be achieved in 30 steps (approximately 7 RPM increase per step). After each speed increase, the DCS receives feedback from a vibration monitoring system (e.g., asset condition monitor 116). The DCS only takes the next step of increasing speed if the feedback from the vibration monitoring system indicates the pump health remains good at the new speed. On the other hand, if the feedback is negative, the DCS steps down the speed to bring the pump back to the previous speed at which the pump was stable.

Figure 6:
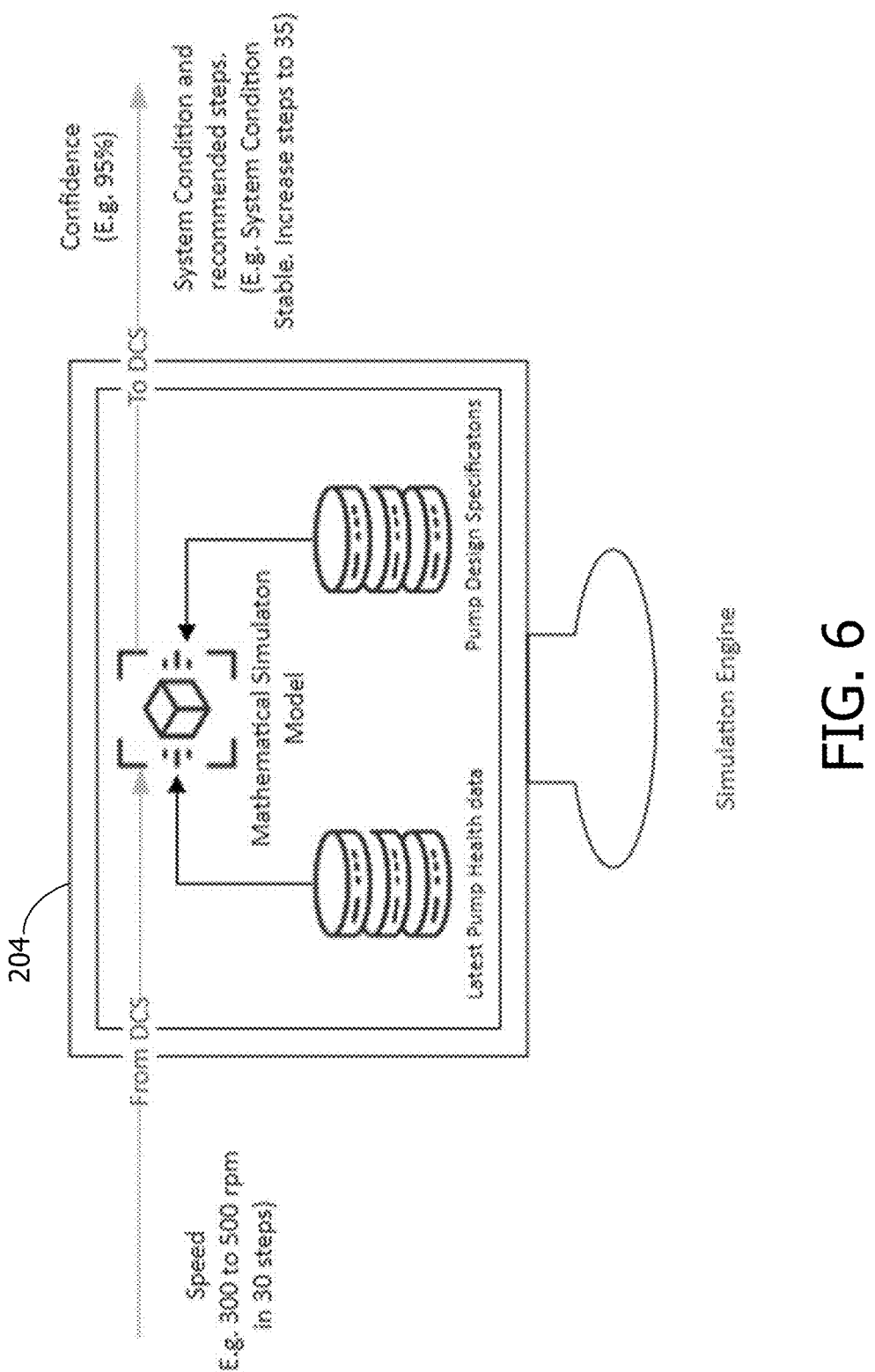
FIG. 6 is a block diagram illustrating further aspects of a simulation engine according to an embodiment.

FIG. 6 is a block diagram illustrating further aspects of control system 100 according to an embodiment. In the illustrated embodiment, control processor 202 is responsive to feedback from simulation engine 204. In FIG. 6, the process advisor (e.g., optimization subsystem 306) recommends a new flowrate setpoint, which is then converted to pump RPM by controller 104 of a DCS. The DCS decides a speed change based on the new flowrate setpoint. For example, if the DCS wants to change the speed from 300 RPM to 500 RPM, the DCS may DCS decide that the 200 RPM increase should be achieved in 30 steps (approximately 7 RPM increase per step). The DCS feeds the new speed to simulator engine 204 and receives system condition feedback. Based on the simulator feedback, the DCS increases or decreases pump speed in steps (e.g., 10% of total speed change). The simulation engine 204 also suggests when the new speed cannot be achieved. After each speed increase, the DCS receives feedback from the vibration monitoring system (e.g., asset condition monitor 116). The DCS only takes the next step of increasing speed if the feedback from the vibration monitoring system indicates the pump health remains good at the new speed. On the other hand, if the feedback is negative, the DCS steps down the speed to bring the pump back to the previous speed at which the pump was stable.

In an aspect, a method for controlling operation of industrial asset 114, such as a motor or pump, comprises measuring or calculating (i.e., monitoring) vibration, motor current signature analysis, and other conditional parameters of asset 114. The method further includes analyzing the data in the frequency domain to identify patterns indicative of anomalous conditions in response. The method also comprises Identifying a new setpoint or operating condition for asset 114 to address or overcome the anomalous conditions and predicting the vibration pattern of asset 114 in response to updating the setpoint or operating condition to the new setpoint or operating condition. In an embodiment, the new setpoint or operating condition is identified using an iterative process and the resulting vibration pattern is predicted using simulator engine 204. The method further comprises determining if the new setpoint or operating condition is an optimum setpoint or operating condition for the asset 114 to address or overcome the anomalous conditions and if the new setpoint or operating condition can be safely applied. In response to determining the new setpoint or operating condition is an optimum setpoint or operating condition for asset 114 to address or overcome the anomalous conditions, and the new setpoint or operating condition can be safely applied, the method includes controlling asset 114 using asset health data (e.g., vibration data) and process data (e.g., to avoid catastrophic failure of asset and increase asset life).

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A controller comprising:

a control processor configured to be coupled to an asset of an industrial process, wherein the control processor is configured to generate a control signal for controlling the asset, and wherein the asset performs an operation of the industrial process in response to the control signal;

an asset condition monitor coupled to the control processor, wherein the asset condition monitor is configured to perform at least one of a vibration analysis, a current signature analysis, a voltage signature analysis, or a frequency domain pattern analysis based on at least one sensor signal generated by one or more sensors monitoring the asset during performance of the operation for determining a present condition of the asset performing the operation of the industrial process in response to the control signal, and wherein the control processor is further configured to generate a modified control signal based on the determined present condition of the asset; and a simulation engine coupled to the control processor, wherein the simulation engine is configured to simulate the asset performing the operation of the industrial process in response to the modified control signal and to predict a future condition of the asset as a function thereof; and wherein the control processor provides the modified control signal to the asset and controls the asset based on the modified control signal in response to the predicted future condition of the asset indicating the asset is operating in a desired condition.

2. The controller of claim 1, wherein the control signal specifies an operating setpoint for the asset and wherein the modified control signal specifies a new operating setpoint for the asset.

3. The controller of claim 2, wherein the control processor is configured to execute an iterative process for setting the new operating setpoint.

4. The controller of claim 2, wherein the control processor reverts the new operating setpoint to a previous setpoint in response to the predicted future condition of the asset indicating the asset is operating in an undesired condition, and wherein the previous setpoint corresponds to when the asset last operated in the desired condition.

5. The controller of claim 1, wherein the asset comprises a motor or a pump and the new operating setpoint is related to operation of the motor or the pump, respectively.

6. The controller of claim 1, wherein the control processor generates the modified control signal in response to the determined present condition of the asset indicating the asset is operating in an undesired condition.

7. The controller of claim 6, wherein the undesired condition is indicative of excessive vibration or an anomalous motor current signature or both.

8. A method of controlling an industrial asset performing an operation of an industrial process, the method comprising:

providing a setpoint to the asset for controlling the asset, wherein the asset performs the operation of the industrial process based on the setpoint;

monitoring one or more operating parameters of the asset performing the operation of the industrial process;

performing at least one of a vibration analysis, a current signature analysis, a voltage signature analysis, or a frequency domain pattern analysis based on at least one sensor signal generated by one or more sensors monitoring the asset during performance of the operation to determine a present condition of the asset performing the operation of the industrial process in response to the setpoint and the one or more operating parameters;

in response to the present condition indicating the asset is operating in an undesired condition, identifying a new setpoint for the asset to address the undesired condition;

predicting a future condition of the asset as a function of the asset operating based on the new setpoint;

providing the new setpoint to the asset in response to the predicted future condition of the asset indicating the asset is operating in a desired condition; and controlling the asset based on the new setpoint in response to the predicted future condition of the asset indicating the asset is operating in a desired condition.

9. The method of claim 8, wherein identifying the new setpoint comprises executing an iterative process for setting the new operating setpoint.

10. The method of claim 8, wherein identifying the new setpoint comprises reverting to a previous setpoint in response to the predicted future condition of the asset indicating the asset is operating in an undesired condition, and wherein the previous setpoint corresponds to when the asset last operated in the desired condition.

11. The method of claim 8, wherein predicting a future condition of the asset comprises executing a simulation of the asset operating based on the new setpoint.

12. An automation system comprising:

an asset of an industrial process;

a control processor coupled to the asset, wherein the control processor is configured to generate a control signal for controlling the asset, and wherein the asset performs an operation of the industrial process in response to the control signal;

one or more sensors configured to monitor the asset during performance of the operation and generate at least one sensor signal representative thereof;

a memory storing computer-executable instructions that, when executed, configure the control processor for:

performing at least one of a vibration analysis, a current signature analysis, a voltage signature analysis, or a frequency domain pattern analysis based on at least one sensor signal generated by one or more sensors monitoring the asset during performance of the operation to determine a present condition of the asset in response to the asset performing the operation of the industrial process based on the control signal and the at least one sensor signal;

generating a modified control signal based on the determined present condition of the asset;

simulating the asset performing the operation of the industrial process in response to the modified control signal;

predicting a future condition of the asset as a function of the simulating;

providing the modified control signal to the asset; and controlling the asset based on the modified control signal in response to the predicted future condition of the asset indicating the asset is operating in a desired condition.

13. The system of claim 12, wherein the control signal specifies an operating setpoint for the asset and wherein the modified control signal specifies a new operating setpoint for the asset.

14. The system of claim 13, wherein the control processor is configured to execute an iterative process for setting the new operating setpoint.

15. The system of claim 13, wherein the control processor reverts the new operating setpoint to a previous setpoint in response to the predicted future condition of the asset indicating the asset is operating in an undesired condition, and wherein the previous setpoint corresponds to when the asset last operated in the desired condition.

16. The system of claim 12, wherein the asset comprises a motor or a pump and the new operating setpoint is related to operation of the motor or the pump, respectively.

17. The system of claim 12, wherein generating the modified control signal is responsive to the determined present condition of the asset indicating the asset is operating in an undesired condition.

18. The system of claim 17, wherein the undesired condition is indicative of excessive vibration or an anomalous motor current signature or both.

* * * * *